US010452110B2

(12) United States Patent
Brown et al.

(10) Patent No.: US 10,452,110 B2
(45) Date of Patent: Oct. 22, 2019

(54) COMBINATION OF CONTROL INTERFACES FOR MULTIPLE COMMUNICATING DOMAINS

(71) Applicant: ARM Limited, Cambridge (GB)

(72) Inventors: Dominic William Brown, Ely (GB); Ashley John Crawford, Ashdon (GB); Christopher Vincent Severino, Haverhill (GB)

(73) Assignee: ARM Limited, Cambridge (GB)

( * ) Notice: Subject to any disclaimer, the term of this patent is extended or adjusted under 35 U.S.C. 154(b) by 280 days.

(21) Appl. No.: 15/462,146

(22) Filed: Mar. 17, 2017

(65) Prior Publication Data
US 2017/0269657 A1 Sep. 21, 2017

(30) Foreign Application Priority Data

Mar. 18, 2016 (GB) .................................. 1604633.6

(51) Int. Cl.
*G06F 1/26* (2006.01)
*G06F 13/16* (2006.01)
*G06F 1/3234* (2019.01)
*G06F 1/3287* (2019.01)

(52) U.S. Cl.
CPC .............. *G06F 1/26* (2013.01); *G06F 1/3243* (2013.01); *G06F 1/3287* (2013.01); *G06F 13/1689* (2013.01); *Y02D 10/152* (2018.01); *Y02D 10/171* (2018.01); *Y02D 50/20* (2018.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| 7,346,784 | B1 * | 3/2008 | Theron | G01R 31/318516 |
| | | | | 713/300 |
| 9,407,264 | B1 * | 8/2016 | Ali | H03K 19/0016 |
| 2011/0043983 | A1 | 2/2011 | Kondou | |
| 2012/0275236 | A1 * | 11/2012 | Hess | G06F 1/3203 |
| | | | | 365/189.02 |
| 2016/0011650 | A1 | 1/2016 | Yang et al. | |

OTHER PUBLICATIONS

UKIPO Examination and Search Report; GB 1604633.6; dated Aug. 11, 2016.

* cited by examiner

*Primary Examiner* — Zahid Choudhury
(74) *Attorney, Agent, or Firm* — Pramudji Law Group PLLC; Ari Pramudji

(57) ABSTRACT

Various implementations described herein are directed to a method and apparatus for a low power interface combiner for controlling a cross domain component in a system of two or more power domain controls. The combiner may include a first state for requesting cross domain component quiescence when a first control requests quiescence and a second state for ensuring cross domain component quiescence before accepting the first control quiescence request. The combiner may include a third state for requesting cross domain component quiescence exit when a last control requests quiescence exit and other controls have exited or are exiting quiescence. The combiner may include a fourth state for ensuring cross domain component quiescence exit before accepting the last control quiescence exit request.

16 Claims, 9 Drawing Sheets

| QREQn | QACCEPTn | QDENY | Interface state |
|---|---|---|---|
| 1 | 1 | 0 | qrun |
| 0 | 1 | 0 | qrequest |
| 0 | 0 | 0 | qstopped |
| 1 | 0 | 0 | qexit |
| 0 | 1 | 1 | qdenied |
| 1 | 1 | 1 | qcontinue |

Combiner Method 500

55 Keeping a second control quiescence request in a quiescence request state after a first control quiescence request and subsequent second control quiescence request until the first control and component quiescence request have been accepted or denied 51A → State 44/49

56 Denying a control quiescence request if a component quiescence request is denied.

State 45/50

57 Ensure component denial handshake is complete before completing the controller handshake State 43

FIGURE 5B

Combiner Method 500

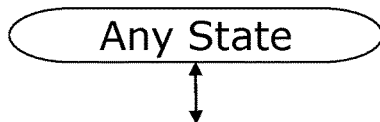
Any State

58 Stalling, when there is an ongoing request from a control that affects the state of the component, any requests from other controls until the ongoing control transaction is complete

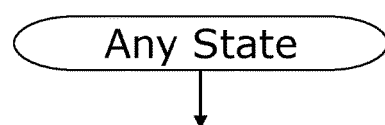
Any State

59 Requesting quiescence and quiescence exits simultaneously over two or more component channels when there are two or more cross domain power components 60 Accepting control quiescence request and quiescence exit request only when all components have accepted the request.

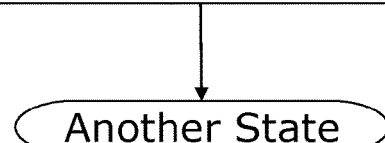
Another State

FIGURE 5C

COMBINATION OF CONTROL INTERFACES FOR MULTIPLE COMMUNICATING DOMAINS

CROSS-REFERENCE TO RELATED APPLICATIONS

This application claims priority to United Kingdom Patent Application No. GB 1604633.6 filed 2016 Mar. 18, the entire disclosure of which is herein incorporated by reference.

FIELD OF THE INVENTION

The present techniques relates to the control of multiple domains which communicate with each other. More particularly, the techniques relate to the power control interfaces for these domains.

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Communication between domains and system management can be performed using a quiescence (Q) channel activity indicator signal and a handshake. The activity indicator signal indicates when the domain is idle and a power controller can attempt to remove power. Power removal is confirmed by the quiescence channel handshake initiated by the power controller for that domain.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

FIG. 5A, 5B and 5C are method diagrams of processes according to an embodiment.

DETAILED DESCRIPTION

As mentioned above, a cross domain component spans two or more domains, and uses signals from both domains when access to both domains is needed. Methods for controlling a cross domain component which spans two or more domain controls are described below. Methods described herein may comprise requesting cross domain component quiescence, and ensuring cross domain component quiescence before accepting a request from one of the domain controls. The domains may be power domains, timing domains, frequency domains, access control domains, or a combination of one or more functional characteristics. For example, the functional characteristic of the domain may be: power (e.g., 5V or 12V), timing (e.g., synchronous or asynchronous), frequency (e.g., 5 GHz or 2.5 GHz), access control (e.g., regular access or secure access), or a combination of one or more functional characteristics.

In an illustrative example, the cross domain component may span two or more power domains. In this example, each power domain may have a particular power or voltage value for the cross domain component to enter a quiescent state. For instance, a first power domain may be, e.g., 12V, a second power domain may be, e.g., 5V, and the cross domain component may use both power domains (12V and 5V) to enter a quiescent state before the cross domain component may accept a request for quiescence from one of the power domains.

In another illustrative example, the cross domain component may span two or more timing domains. In this example, each timing domain may have to have a particular timing control/type in order for the cross domain component to enter a quiescent state. For instance, a first timing domain may be, e.g., synchronous, a second timing domain may be, e.g., asynchronous, and the cross domain component may use both timing domains (synchronous and asynchronous) to enter a quiescent state before the cross domain component may accept a request for quiescence from one of the timing domains.

Accordingly, in the techniques described herein, the domains may be any domains, including, but not limited to, power domains, timing domains, frequency domains, or any functional domains which require access control between them.

Figure 1:
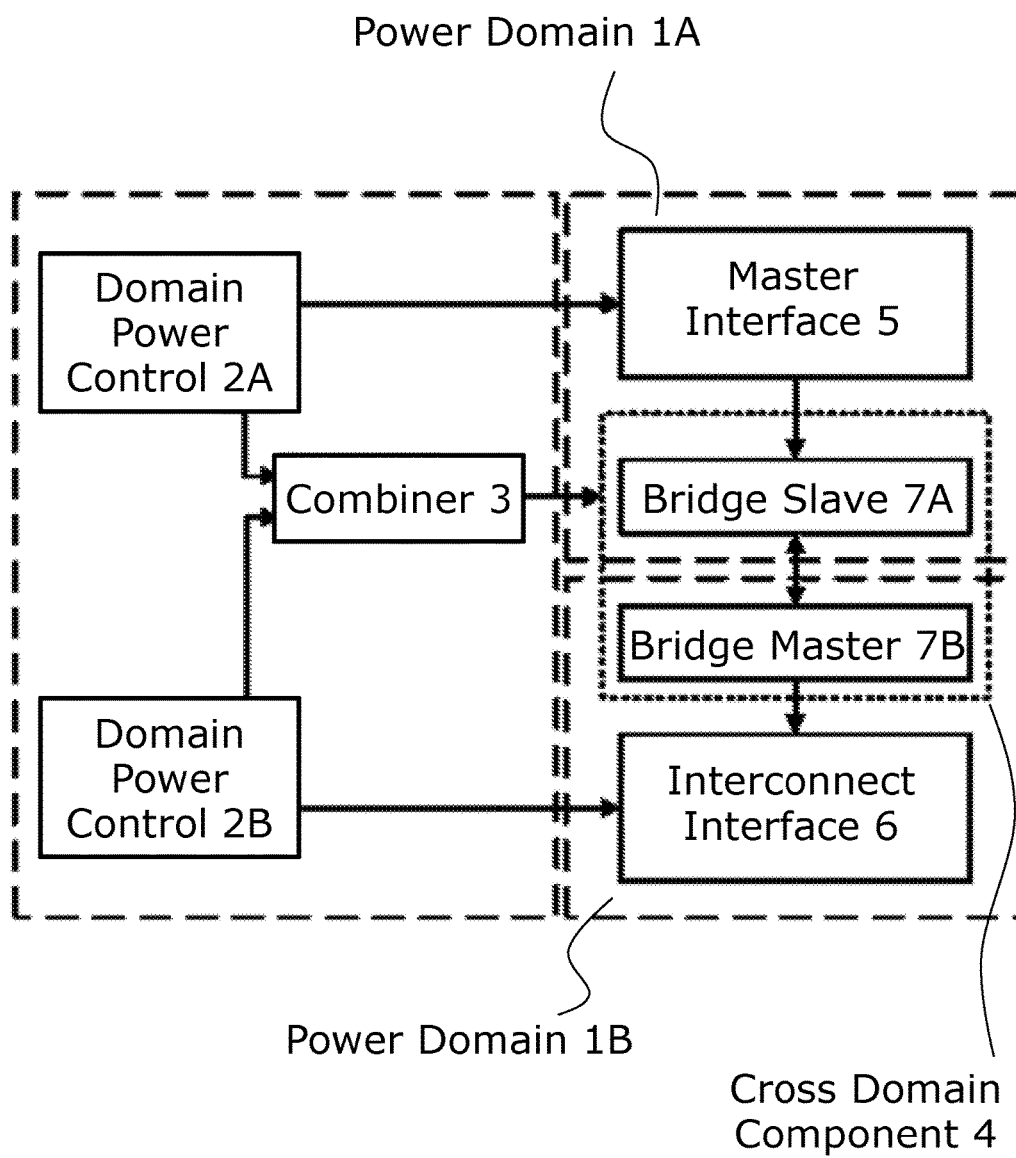
FIG. 1 is a deployment diagram for a combiner in a multi-power domain embodiment.

Referring to FIG. 1, a system on a chip with two power domains (1A and 1B) includes: domain power control 2A and 2B; combiner 3; cross domain component 4 (also known as a bridge component); master interface 5; and interconnect interface 6. An example interface, such as a protocol bus, often crosses domains, where this occurs there needs to be a cross domain component to manage: access control (where this cannot be managed with isolation cells alone); clock domain crossing; and voltage domain crossing. Cross domain component 4 has a part in each domain.

Cross domain component 4 crosses domains 1A and 1B and comprises respective bridge slave 7A (connected to master interface 5 in domain 1A) and bridge master 7B (connected to interconnect 6 in domain 1B). When the power domains can independently request power off of to cross domain component 4 then power off cannot be handled by one domain or the other; cross domain component 4 has to be closed before the first domain powers off and only opened when both or all domains are powered on. High-level management is required to ensure the state of this cross domain component related to both domains. So there must be tracking of each domain that can place a burden on the high level control where there are many independent domains. It also limits each domain to be controlled as an autonomous entity so making power management less responsive and less efficient.

Embodiments make use of hardware low power interface Q channel to put the cross domain component into a quiescent state. In this case the power control for the cross domain component cannot be handled solely by one domain as described above. The status of multiple power control low power interfaces on a cross domain component, one for each domain, cannot be resolved without race conditions when either side of the cross domain component can be powered off independently.

Embodiments use a combination of hardware low power interfaces to and from different domains to control a single cross domain component, for the cross domain component in this example dependent on requests from both domains. This can be done in hardware allowing each domain to be treated independently by the power controller or its independent power control logic reducing the implementation complexity and increasing the efficiency.

In one embodiment the combiner comprises the following rules: the cross domain component is put in a quiescent state when either domain is quiescent; and the cross domain component is only brought out of a quiescent state when both domains become active.

Figure 2:
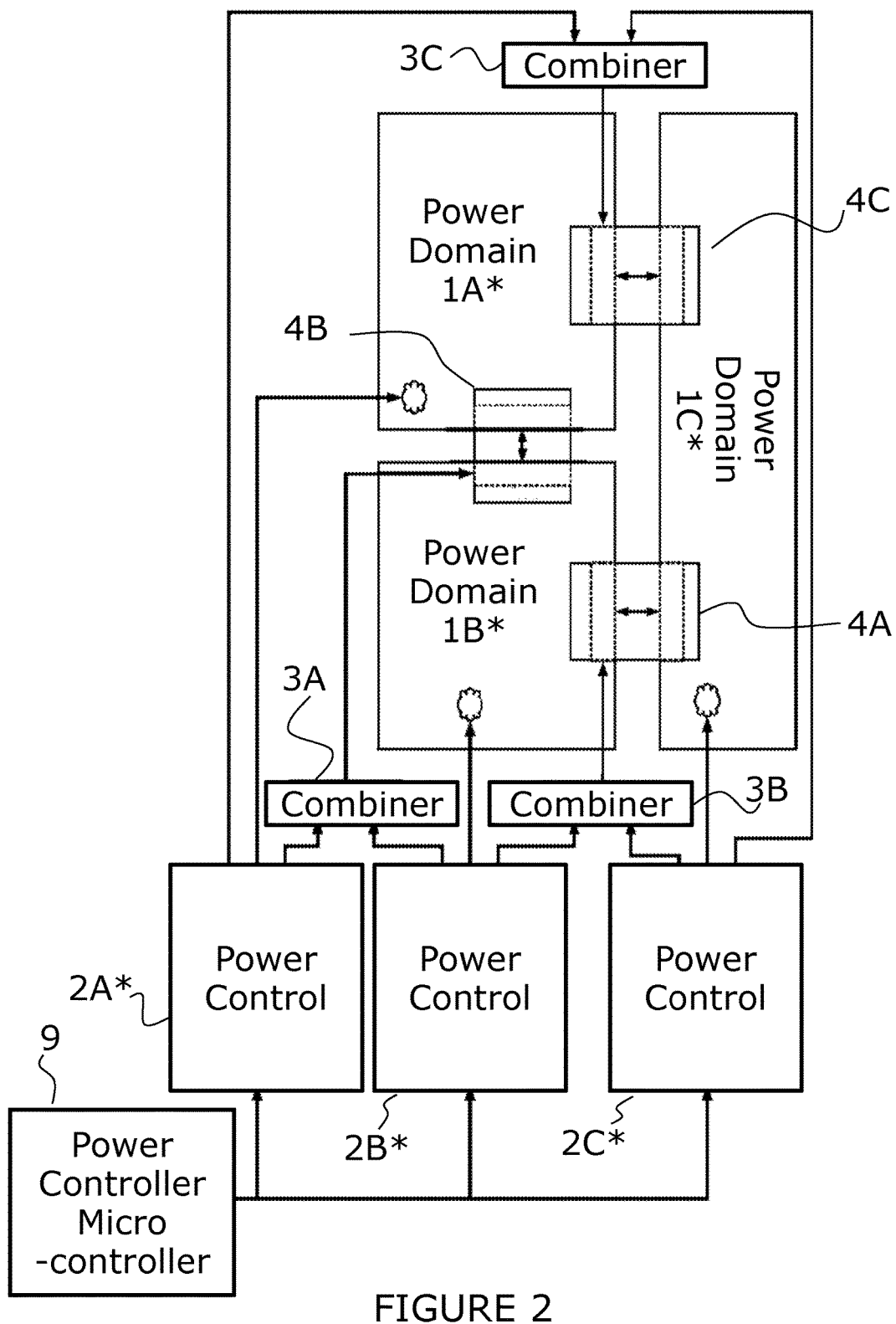
FIG. 2 is a deployment diagram for two combiners in a multi-power domain embodiment.

Referring to FIG. 2, a system with two combiners comprises: power domains 1A*, 1B* and 1C*; power control 2A*, 2B* and 2C*; combiners 3A, 3B and 3C; cross domain components 4A, 4B and 4C; and power controller microcontroller 9. Power domains 1A*, 1B* and 1C* are three different power domains in the system. Power control 2A*, 2B* and 2C* control the power to each of these respective domains. Combiners 3A, 3B and 3C are for controlling respective cross domain components 4A, 4B and 4C.

Figures 3A, 3B:
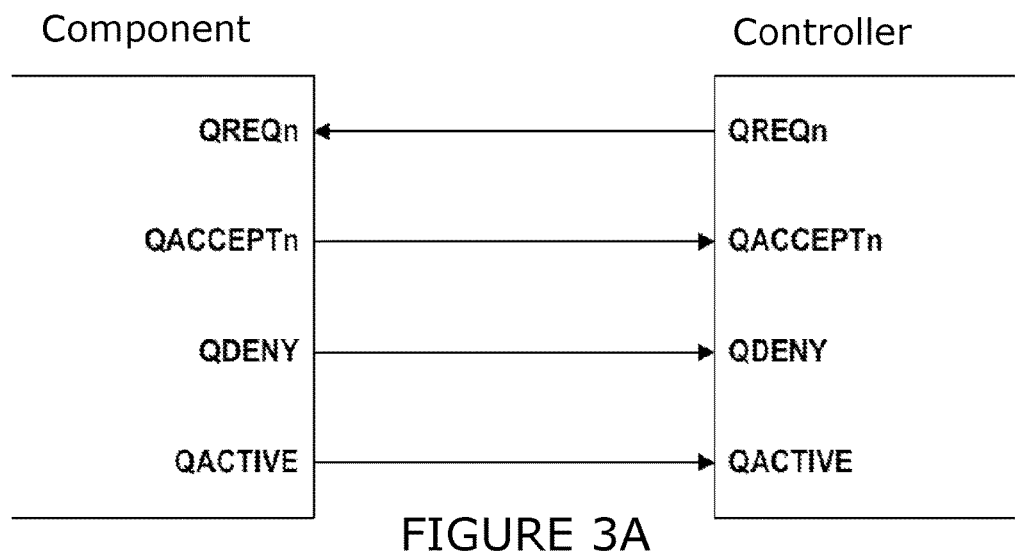
FIG. 3A is a Q channel component signalling diagram.
FIG. 3B is a Q channel handshake state table.

Referring to FIG. 3A, Q channel signals between a component and a power controller are described. A Q channel is a low-power interface for managing component quiescence that simplifies domain crossing by making the handshake mechanism independent of the component activity. The Q channel interface includes the following signals: QACTIVE; QREQn; QACCEPTn; and QDENY.

QACTIVE is a component (sometimes referred to as a device) activity indication and can be driven high by a component in any state to indicate that it has operations to perform. When QACTIVE is driven low by a component it is a hint, not a guarantee, that the component might accept a quiescence request. The QACTIVE signal from a component can be composed from a number of source signals. To provide wake-up capabilities, these can include component input signals. The final QACTIVE signal must be driven either directly by a register or by a number of registers whose outputs are combined using a logical OR.

QREQn is a quiescence request signal, driven by a controller.

QACCEPTn and QDENY are an acknowledgement signal pair driven back to the controller by the component to indicate acceptance or denial of a request. The acknowledgement signals are organized such that only one of them changes per handshake transition. This ensures that the interface can be implemented safely across asynchronous boundaries. QACCEPTn is used to accept a request. QDENY is used to deny a request. The QACCEPTn and QDENY signals from a component and the QREQn signal from a controller must all be driven by registers. The denial mechanism means a component can maintain an operational state while having a mechanism by which it can promptly complete the handshake of a quiescence request. The polarities of the handshake signals are organized to provide a quiescent state where all interface signals are low.

QREQn, QACCEPTn, QDENY are handshake signal states and are independent of the state of QACTIVE which is a component activity state. Therefore, transitions on QACTIVE are not restricted by the values on QREQn or on the QACCEPTn and QDENY output pair. All signals are assumed to be asynchronous.

Referring to FIG. 3B, Q channel handshakes states are described.

Handshake state qrun. When QREQn and QACCEPTn are high (QDENY is low) then the component is operational and the interface state is called qrun.

Handshake state qrequest. When QREQn is low and QACCEPTn is high (QDENY is low) then the component is operational but has been requested to become quiescent when idle. The interface state is called qrequest.

Handshake state qstopped. When QREQn and QACCEPTn are low (QDENY is low) then the component has entered the quiescent state. This is the only state where the controller does not guarantee the availability of any resource managed by the interface. The interface state is called qstopped.

Handshake state qexit. When QREQn is high and QACCEPTn are low (QDENY is low) then supply of power is guaranteed. When the component acknowledges, by deasserting QACCEPTn HIGH, the state moves to qrun. The interface state is called qexit. Deasserting a signal is to stop asserting that signal.

Handshake state qdenied. When QREQn is low and QACCEPTn are high (QDENY is high) then the component denies the request to become quiescent and remains operational. Controller must deassert QREQn. The interface state is called qdenied.

Handshake state qcontinue. When QREQn and QACCEPTn are high (QDENY is high) then the controller deasserts QREQn HIGH after Q_DENIED. The component is operational. The interface state is called qcontinue.

Figure 4A:
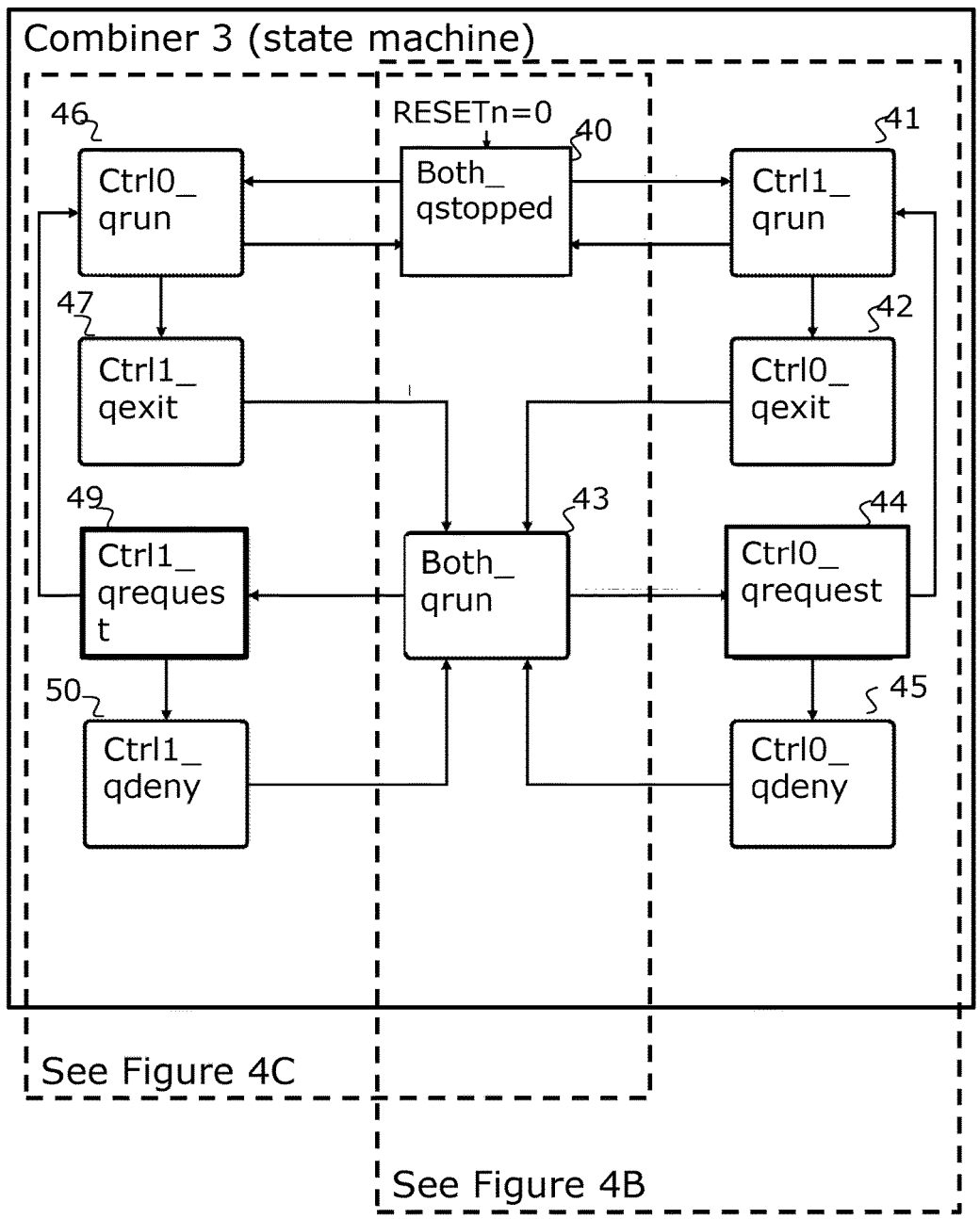
FIG. 4A, 4B and 4C show parts of a state diagram of a combiner according to an embodiment
Figure 4B:
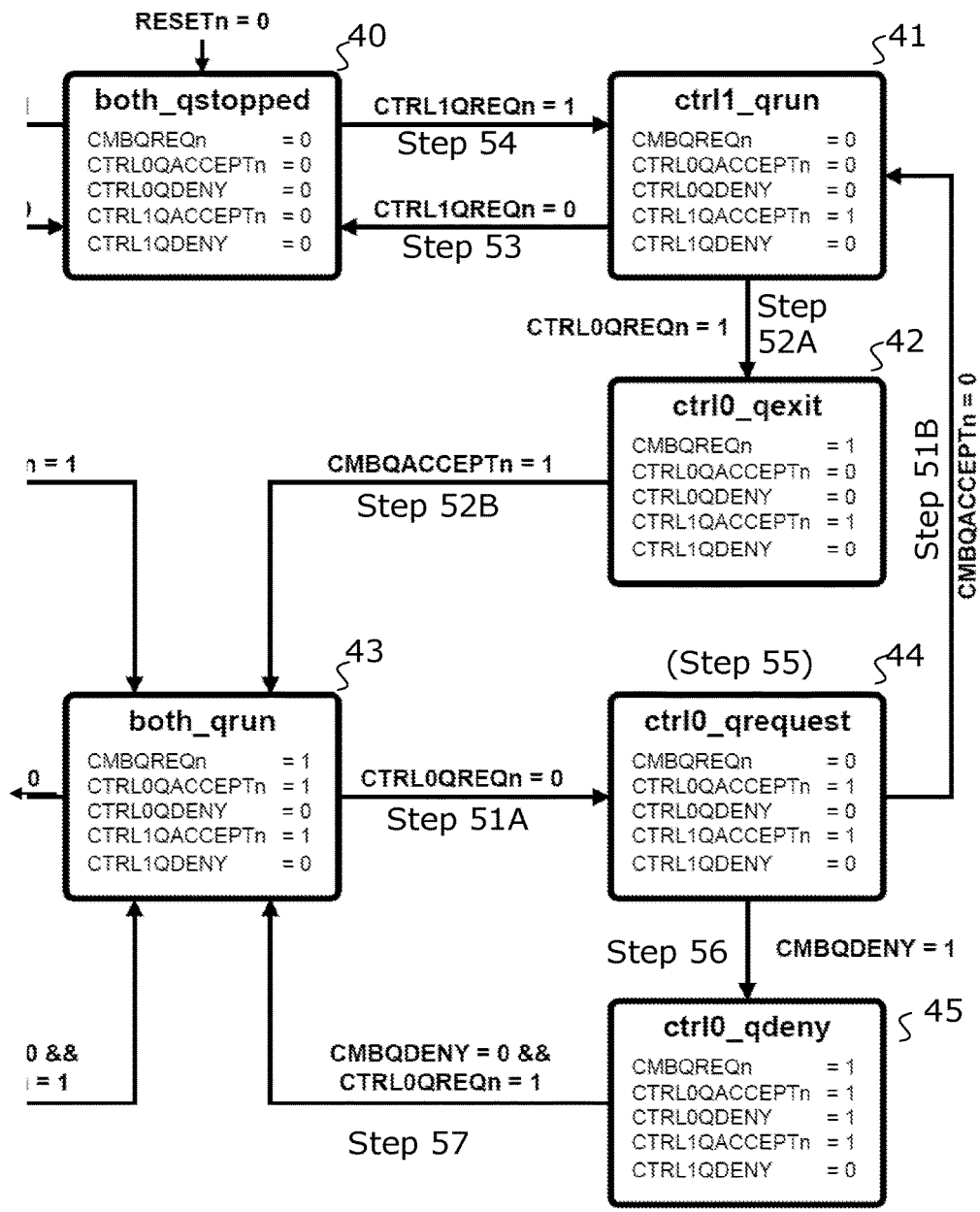
Figure 4C:
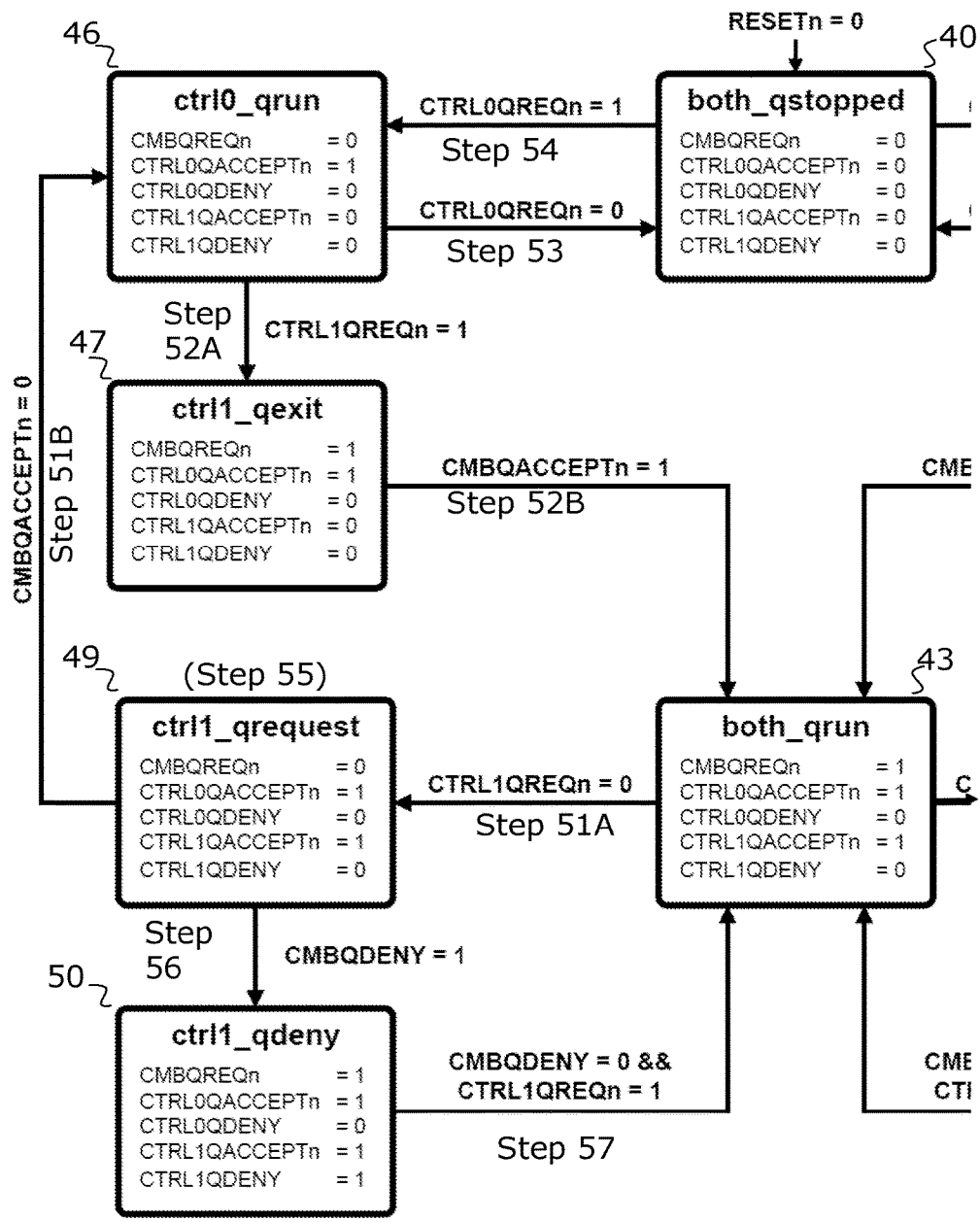
Figure 5A:
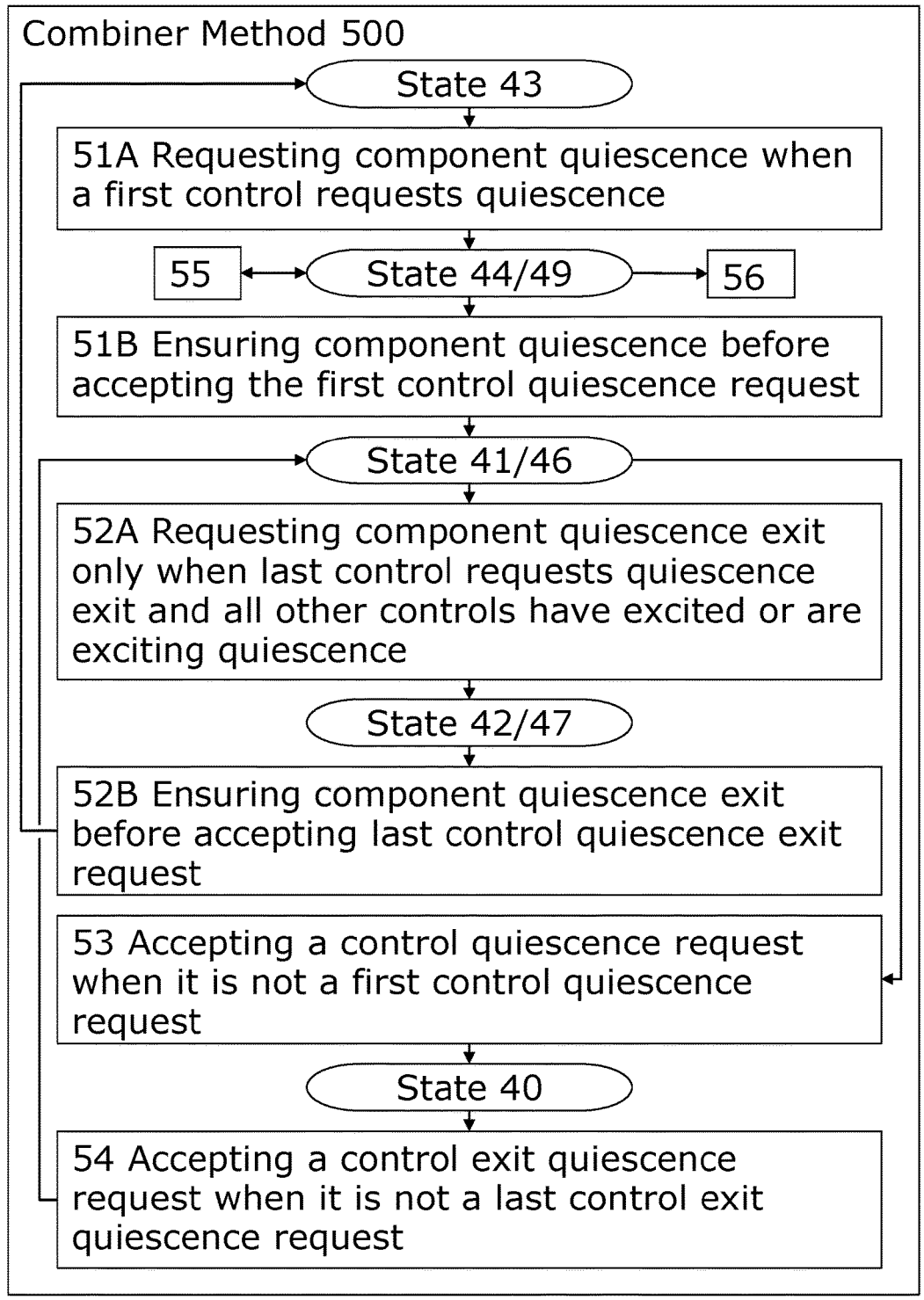

Referring to FIG. 4A, 4B, 4C, 5A and 5B combiner states 40 to 50 are described. FIG. 4A is a state machine diagram of combiner 3 according to an embodiment showing component states 40 to 50. FIG. 4B focuses on the states induced domain power control 2A for power domain 1A (Ctrl0) (states 40 to 45) whereas FIG. 4C focuses on the states induced domain power control 2B for power domain 1B (Ctrl1) (40, 43, 46 to 50). FIG. 5A and 5B show combiner methods between combiner states. A combiner of this embodiment has two Q channels connected to the controls and one Q channel connected to the component, other embodiments can have more than two Q channels and respective controls. The combiner states are related to the states of the individual Q channels.

State 40 is both qstopped after a RESET has been performed. Component QREQn (CMBQREQn) is low; Control0 QACCEPTn (CTRL0QACCEPTn) is low; Control0 Deny (CTRL0QDENY) is low; Control1 QACCEPTn (CTRL1QACCEPTn) is low; Control1 QDENY (CTRL1QDENY) is low. If control1 makes a quiescence exit request by taking QREQn high (CTRL1REQn=1) then combiner accepts the request (step 54) moves to a state 41. If control0 makes a quiescence exit request by taking QREQn high (CTRL0REQn=1) then combiner accepts the request (step 54) moves to state 46.

State 41 is ctrl1_run. CTRL1QACCEPTn has changed to high. Other signals stay the same: CMBQREQn is low; CTRL0QACCEPTn is low; CTRL0QDENY is low; CTRL1QDENY is low. If control1 makes a quiescence request (CTRL1QREQn=0) then the combiner accepts the request (step 53) and moves to a state 40. If control0 makes a quiescence exit request (CTRL0QREQn=1) then the combiner requests the component for quiescence exit (step 52A) moves to state 42.

State 42 is ctrl0_qexit. CMBQREQn has changed to high to request a component quiescence exit. Other signals stay the same: CTRL0QACCEPTn is low; CTRL0QDENY is low; CTRL1QACCEPTn is high; CTRL1QDENY is low. When the component makes a quiescence exit acceptance (CMBQACCEPTn=1) then combiner accepts a control0 request for exit (step 52B) and moves to state 43.

State 43 is both_qrun where both domains and the component are running. CTRL0QACCEPTn has changed to high. Other signals stay the same; CMBQREQn is high; CTRL0QDENY is low; CTRL1QACCEPTn is high; CTRL1QDENY is low. If control1 makes a quiescence request (CTRL1QREQn=0) then the combiner requests component quiescence (step 51A) and moves to a state 49. If control0 makes a quiescence request (CTRL0QREQn=0) then the combiner requests component quiescence (step 51A) and moves to state 44.

State 44 is CTRL0_qrequest. CMBQREQn has changed to low to signal a component quiescence request. Other signals stay the same; CTRL0QACCEPTn is high; CTRL0QDENY is low; CTRL1QACCEPTn is high; CTRLQDENY is low. If the component accepts the quiescence request then the combiner accepts the control0's quiescence request (step 51B) back to state 41. If the component denies the quiescence request then the combiner denies control0's quiescence request (step 56) and goes to state 45. If a control1 quiescence request comes in after control0's quiescence request but before control0's acceptance then it is kept in a state of quiescence until the first control and component quiescence requests have been denied or accepted (step 55).

State 45 is CTRL0_deny. CMBQREQn has changed to high and CTRL0QDENY has changed to high. Other signals stay the same: CTRL0QACCEPTn is high; CTRL1QACCEPTn is high; and CTRL1QDENY is low. When the component sends a deny signal and control0 makes a quiescence exit request then combiner stops denying the control request and state 43.

State 46 is CTRL0_run. CTRL0QACCEPTn has changed to high. Other signals stay the same: CMBQREQn is low; CTRL0QDENY is low; CTRL1QACCEPTn is low; and CTRL1QDENY is low. If control1 makes a quiescence exit request (CTRL1QREQn=1) then the combiner moves to a state 47. If control0 makes a quiescence request (CTRL0QREQn=0) then the combiner moves to state 40.

State 47 is CTRL1_qexit. CMBQREQn has changed to high to request a component quiescence exit. Other signals stay the same: CTRL0QACCEPTn is high; CTRL0QDENY is low; CTRL1QACCEPTn is low; CTRL1QDENY is low. When the component makes a quiescence exit acceptance (CMBQACCEPTn=1) then the combiner moves to state 43.

State 48 is CTRL1_qrequest. CMBQREQn has changed to low to signal a component quiescence request. Other signals stay the same; CTRL0QACCEPTn is high; CTRL0QDENY is low; CTRL1QACCEPTn is high; CTRL1QDENY is low. If the component accepts the quiescence request then back to state 46. If the component denies the quiescence request then state 50.

State 50 is CTRL1_deny. CMBQREQn has changed to high and CTRL1QDENY has changed to high. Other signals stay the same: CTRL0QACCEPTn is high; CTRL1QACCEPTn is high; and CTRL0QDENY is low. If the component sends a deny signal and control 1 makes a quiescence exit request then state 43.

Referring in more detail to FIG. 5A, 5B and 5C, a method of an embodiment is described for controlling a cross power domain component in a system of two or more power domain controls, said method comprising logical process step 51 to 60.

State 43 is the both-qrun state when the controls and component are active. At an unspecified time in the future one of the controls will make a quiescent request of the combiner. The term control is used in the same sense as the term controller and the terms can be used interchangeably.

Step 51A is for requesting cross domain component quiescence when a first control requests quiescence and then going to state 44 or 49 until the component signals acceptance (step 51B going to state 41 or 46 or denial (step 56 going to state 45 or 50) or a second control requests quiescence (step 55 stalling). If the initial component request is denied then a subsequent quiescence request would make an additional component quiescence request that can be accepted or denied independently.

Step 51B is for ensuring cross domain component quiescence before accepting the first control quiescence request and then state 41 or 46. At an unspecified point one of the controls will make a further request (step 52A or step 53).

Step 52A is for requesting cross domain component quiescence exit only when a last control requests quiescence exit and all other controls have excited or are exiting quiescence and then state 42 or 47 until the component accepts.

Step 52B is for ensuring cross domain component quiescence exit before accepting the last control quiescence exit request and then state 43.

Step 53 is for accepting a control quiescence request when it is not the first control quiescence request. As there is no effect on the component state then the acceptance can be immediate. Then state 40 until a control wants to exit quiescence.

Step 54 is for accepting a control exit quiescence request when it is not the last control exit quiescence request. As there is no effect on the component state then the acceptance may be immediate. Then state 41 or 46.

Step 55 is for keeping a second control quiescence request in a quiescence request state after a first control quiescence request and subsequent second control quiescence request until the first control and component quiescence request have been accepted or denied. Then back to state 40 if the first controller request is accepted.

Step 56 is for denying a control quiescence request if a component quiescence request is denied. Then state 45 or 50 before step 57.

Step 57 is for ensuring that the component denial handshake is complete before completing the controller handshake. Then state 43.

In any state, step 58 can be performed.

Step 58 is for stalling, when there is an ongoing request from a control that affects the state of the component, any requests from other controls until the ongoing control transaction is complete. The state stays the same.

In any state, steps 59 and 60 can be performed.

Step 59 is for requesting quiescence and requesting exit from quiescence simultaneously over two or more component channels when there are two or more cross domain power components. Each component can take different times to complete and have different responses. Then step 60.

Step 60 is for accepting control quiescence request and quiescence exit request only when all components have accepted the request. A different state is arrived at.

In a system where domains communicate with each other, typically a cross domain component is required to pass transactions from one domain to another, due to clock differences, or to provide access control based on the state of the other domain, either because it is powered off or has not been, or is being, reconfigured.

As a cross domain component spans two or more domains, the power controllers need to be aware of the state of both domains to allow correct control of this component. This control cannot be in any of the domains if they can be powered off or reset individually as it would lose track of the state of the other domain.

Therefore a separate entity outside of the domains is required to control this cross domain component and enable and disable it at correct times, dependant on requests from the power controllers of both domains.

This allows the controllers for each domain to remain independent and prevent additional dependency complexities either in hardware or software.

A Q channel interface enables the controller to manage entry to, and exit from, a component quiescent state. Quiescence management can be for clock gated states, power gated states and any other type of functional gated state using domains. A Q channel interface has the capability to indicate a requirement for exit from the quiescent state. The associated signalling can contain contributions from other components dependent on the interfaced component's operations. A Q channel interface has an optional component capability to deny a quiescence request. A Q channel interface has safe asynchronous interfacing across clock domains.

According to a first technique, there is provided a combiner for controlling a cross domain component in a system of two or more domains with independent controls, said combiner comprising: a first state for requesting cross domain component quiescence when a first control requests quiescence; and a second state for ensuring cross domain component quiescence before accepting the first control quiescence request.

According to a second technique, there is provided a method for controlling a cross domain component, in a system of two or more domains with independent controls, said method comprising: requesting cross domain component quiescence when a first control requests quiescence; and ensuring cross domain component quiescence before accepting the first control quiescence request.

According to a third technique, there is provided a method for controlling a cross domain component, in a system of two or more domain controls and a cross domain component in a quiescence state, said method comprising: requesting cross domain component quiescence exit only when a last control requests quiescence exit and all other controls have exited or are exiting quiescence; and ensuring cross domain component quiescence exit before accepting the last control quiescence exit request.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or component, or any suitable combination of the foregoing.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

It will be clear to one skilled in the art that many improvements and modifications can be made to the foregoing exemplary embodiments without departing from the scope of the present techniques.

The invention claimed is:

1. A machine-implemented combiner state machine for controlling a cross domain component in a system of two or more power domain controls, said combiner comprising:
   a first state logic for requesting cross domain component quiescence when a first control requests quiescence; and
   a second state logic for ensuring cross domain component quiescence before accepting the first control quiescence request; and
   said combiner being operable, when a second control has entered a quiescence request state after a first control quiescence request, to cause the second control to remain in the quiescence request state until the first control and component quiescence request has been accepted or denied.

2. The combiner state machine as claimed in claim 1 further comprising:
   a third state logic for requesting cross domain component quiescence exit only when a last control requests quiescence exit and all other controls have exited or are exiting quiescence; and
   a fourth state logic for ensuring cross domain component quiescence exit before accepting the last control quiescence exit request.

3. The combiner state machine of claim 1, wherein the cross domain component is put in a quiescent state when either domain is quiescent.

4. The combiner state machine of claim 1, wherein the cross domain component is only brought out of a quiescent state when both domains become active.

5. The combiner state machine of claim 1, wherein the cross domain component is put in a quiescent state when either domain is quiescent and wherein the cross domain component is only brought out of a quiescent state when both domains become active.

6. A method for controlling a cross domain component in a system of two or more domain controls, said method comprising:
   requesting cross domain component quiescence when a first control requests quiescence;
   ensuring cross domain component quiescence before accepting the first control quiescence request; and when a second control has entered a quiescence request state after a first control quiescence request, causing the second control to remain in the quiescence request state until the first control and component quiescence request has been accepted or denied.

7. The method according to claim 6 further comprising:
requesting cross domain component quiescence exit only when a last control requests quiescence exit and all other controls have exited or are exiting quiescence; and
ensuring cross domain component quiescence exit before accepting the last control quiescence exit request.

8. The method according to claim 6 further comprising stalling, when there is an ongoing request from a control that affects the state of the component, any requests from other controls until the ongoing control transaction is complete.

9. The method according to claim 6 wherein the control quiescence request is denied if the component quiescence request is denied.

10. The method according to claim 6 wherein if the first control quiescence request is denied, then the second control quiescence request causes an additional component quiescence request that can be accepted or denied independently.

11. The method according to claim 6 wherein when a control is not the last control to request exit from quiescence, then its request is accepted immediately as there is no effect on the component state.

12. The method according to claim 6 wherein when a control is not the first control to request quiescence, then its request is accepted immediately as there is no effect on the component state.

13. The method according to claim 6 wherein for two or more cross domain components, requests for quiescence and quiescence exits are made simultaneously over two or more component channels but each component can take different times to complete and have different responses.

14. The method according to claim 11 wherein control quiescence requests and quiescence exit requests that affect the components are only accepted when all components have accepted the request.

15. The method according to claim 6 wherein the domains are one of: power domains; timing domains; or any functional domains requiring access control between them.

16. A method for controlling a cross domain component in a system having two or more domain controls and the cross domain component in a quiescence state, said method comprising:
requesting cross domain component quiescence exit only when a last control requests quiescence exit and all other controls have exited or are exiting quiescence;
ensuring cross domain component quiescence exit before accepting the last control quiescence exit request; and
when a second control has entered a quiescence request state after a first control quiescence request, causing the second control to remain in the quiescence request state until the first control and component quiescence request has been accepted or denied.

* * * * *